INVENTORS
GLENN E. FERRE
JAMES T. HUXTABLE
BY DARRELL E. STAFFORD

ATTORNEYS

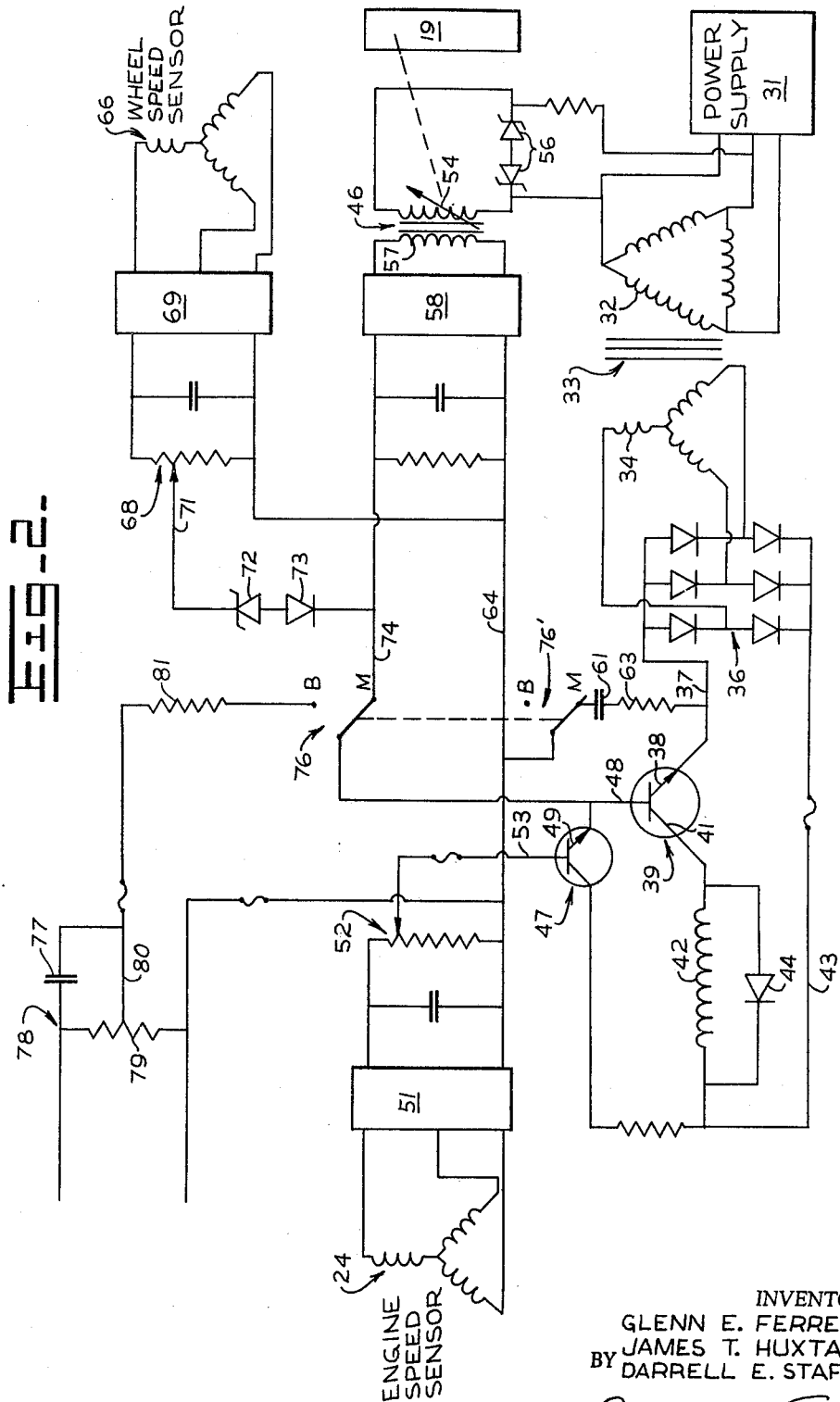

TYPICAL DIESEL ENGINE CHARACTERISTICS

United States Patent Office 3,499,164
Patented Mar. 3, 1970

3,499,164
EXCITATION CONTROL SYSTEM FOR PRIME MOVER DRIVEN GENERATOR
Glenn E. Ferre, James T. Huxtable, and Darrell E. Stafford, Peoria, Ill., assignors to Caterpillar Tractor Co., Peoria, Ill., a corporation of California
Continuation-in-part of application Ser. No. 344,618, Feb. 13, 1964. This application May 5, 1967, Ser. No. 641,732
Int. Cl. B60l 11/02
U.S. Cl. 290—17                    5 Claims

ABSTRACT OF THE DISCLOSURE

To maintain a constant load on a diesel engine for a particular engine throttle setting or to change this load as determined by a new throttle setting, a control unit having a control transistor acts in response to a feedback signal representative of the actual engine speed to produce a control signal which, together with a reference signal representative of a desired engine speed, controls the output of a power transistor thus determining the magnitude of the excitation of the control field of a DC generator driven by the engine. In this manner the excitation of the generator is automatically varied to maintain a constant engine speed and output power for a given throttle setting or the excitation is automatically varied to allow the engine speed and output power to establish a new constant level in response to a new throttle setting.

Cross-reference to related applications

This is a continuation-in-part of assignee's application Ser. No. 344,618, filed Feb. 13, 1964, now abandoned.

Background of the invention

The present invention relates to control systems and more particularly to control systems for diesel-electric drive units on earthmoving vehicles.

Recent trends in the design of earthmoving vehicles have been toward electric drive systems wherein diesel engines supply power to electric generators which in turn supply electric energy to motors which are associated with the driving wheels or tracks of a vehicle. There are several reasons for favoring a diesel-electric drive system over a straight diesel-mechanical system. An electric system can supply power to a remote location on the vehicle without having to employ a long drive shaft or transmission. An electric system can provide very effective dynamic braking, and the overall efficiency of such systems is equal to or higher than that of straight mechanical systems.

While diesel-electric drive systems have been used for some years in connection with locomotives, their use in connection with earthmoving equipment has only recently been given serious thought. One of the great difficulties in adapting the diesel-electric drive system used in locomotives to earthmoving vehicle equipment is the limitation which earthmoving vehicles have with regard to the amount of weight which they can support. Thus, to power an earthmoving vehicle by an electric drive system, it is necessary to reduce the size, weight and number of the components employed in the prior art systems. Another feature of locomotive electric drive systems which is not adaptable for use on earthmoving equipment is the control system. The control systems characteristically used in diesel-electric drive systems for locomotives are complicated, relatively sluggish in their response to changes in manual control settings, and include numerous components which are large and heavy. Thus, in order to provide a diesel-electric drive system for an earthmoving vehicle, it is necessary to provide a control system which makes the overall drive unit more responsive to changes in manual control settings and in which the size, weight and number of components used are reduced.

Reference is here made to U.S. Patent No. 3,263,142 which issued July 26, 1966 from application Ser. No. 505,937 filed on Nov. 1, 1965. In this prior art system components are employed to measure the electrical power output of a generator G. Assignee has found that measurement of power is not required; hence, power measuring components and certain other of the components disclosed in this prior art reference, such as the several function generators and operational amplifiers, have been eliminated.

The prior art in general and in this reference in particular, unlike assignee's invention, requires the use of several feedback and reference signals, hence additional hardware is required to make the control unit operate. In this aforementioned prior art reference, for example, an injection reference signal $ir$, a diesel injection control signal $ic$, is conditioned by an integrating device 30 and the injection error signal $Ei$; becomes, along with diesel power reference signal $PDr$ and generator power signal $PG$ the input to a main operational amplifier 15. This latter amplifier is but one of several of a train of hardware which eventually determines the character of exciting current $Ig$ in the field winding $l$ of generator G.

Summary of the invention

This invention is a closed loop control system for controlling the power output of a diesel engine based on speed information only. Desired engine speed as set and determined by an engine throttle setting is transduced into a desired electrical engine speed signal which is employed as the reference signal for the control system and which is fed to the control unit. Actual engine speed is converted by a tachometer generator associated with the diesel into an electrical feedback signal which is representative of the instantaneous actual engine speed and which is fed back into the control unit. The above-defined reference signal and feedback signal, both indicative of speed only, become the control unit input and the control unit responds by modifying the magnitude of the exciting current normally fed to the generator control field by a power supply associated with the control unit. The invention also provides for overspeed protection and dynamic braking.

Accordingly, it is an object of the present invention to provide a closed loop control system for electric drive earthmoving vehicles.

It is another object of the present invention to provide a closed loop control system for an electric drive earthmoving vehicle wherein the vehicle's response time to operator commands is well within the limitations for proper working operation.

A further object of the present invention is to provide a closed loop control system which senses engine speed to provide a signal for maintaining constant desired engine operating conditions over a wide range of wheel loading conditions.

Still another object of the present invention is to provide a closed loop control system for an electric drive earthmoving vehicle wherein the control system is operative during both motoring and dynamic braking operating conditions of the vehicle.

Further and more specific objects and advantages of the present invention will be made apparent in the following specification wherein a preferred form of the invention is described by reference to the accompanying drawings.

Brief description of the drawings

FIG. 2 is an electrical schematic illustration of the control system of the present invention;

Description of the preferred embodiment

Figure 1:
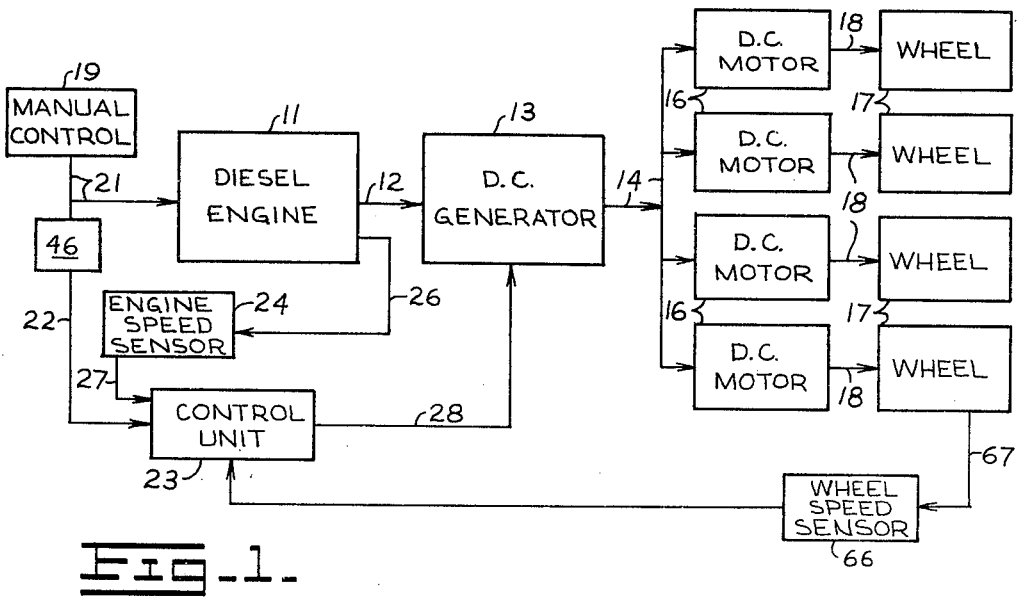
FIG. 1 is a block diagram of the control system of the present invention together with a diesel-electric drive system.

Referring now to FIG. 1, a diesel engine 11 supplies power through a shaft 12 to a D.C. traction generator 13 which in turn supplies electric energy through conductors 14 to a plurality of D.C. traction motors 16. Each of motors 16 is associated with one of the vehicle wheels 17 (or tracks) through a mechanical connection shown generally at 18. Since the only connections between the generator 13 and the motors 16 is by way of relatively flexible electrical conductors 14, each of the D.C. motors can be disposed in very close proximity to the wheel 17 which it operates even though the generator 13 may be at a relatively remote location on the vehicle. This, of course, eliminates the transmission of power through mechanical means over long distance.

A manual control 19 is connected to the diesel engine 11 through mechanical coupling means indicated generally at 21. The control 19 is employed by the vehicle operator to increase or decrease the output power of the engine 11 as the working conditions demand. When it is desired to supply more power to the wheels 17, for instance, the manual control 19 is adjusted to increase engine output power which results in engine 11 operating at a higher speed. As the engine 11 operates at a higher speed the drive shaft 12 turns the generator 13 at a higher speed resulting in a larger voltage output from the generator 13 which in turn enables the D.C. motors 16 to provide greater power to the wheels 17.

The manual control 19 is operatively associated with a control unit 23 through a transducer 46 and connecting linkage 22. Control unit 23 is operatively associated with the engine 11, generator 13 and manual control 19. The control unit 23 is operative during operation at a fixed manual control setting and also in response to a change in the manual control setting. At a fixed setting the control unit functions to maintain a constant load on the engine. When the manual control setting is changed, the control unit operates to minimize the delay in realizing a corresponding change in the power output from the engine-generator unit.

The control unit 23 is associated with the manual control 19 through the transducer 46 and linkage 22 as mentioned above. The control unit is associated with the diesel engine 11 through an engine speed sensor 24. Speed sensor 24 is mechanically linked to diesel engine 11 through a mechanical connection generally shown at 26 through which the sensor 24 is driven at a speed which is a function of the speed of the engine 11. The sensor 24 provides via conductor 27, an electrical output signal which is a function of engine speed, and introduces this signal to control unit 23. The control unit is also in communication with D.C. generator 13 through an electrical connection shown generally at 28.

The generator 13 includes field coils (not shown) which provide the electromagnetic field through which the rotor of the generator passes to transform the mechanical energy of the turning shaft 12 into electrical energy. When the strength of the generator field (and thus the current in the field coils) is below a certain minimum value dependent on the particular characteristics of the generator employed, the output voltage of the generator will not be sufficient to operate the vehicle under working conditions. The field coils of generator 13 include a set of shunt coils which establish a field within the generator 13 which is slightly below the field required to operate the vehicle under load conditions. The field coils further include a control coil which provides an electromagnetic field in addition to that furnished by the shunt coils. The field provided by the control coil (control field) adds to the shunt field to establish an overall field having sufficient strength to supply electrical energy sufficient to operate the vehicle under all normal working conditions.

Looking first at the operation of the control system under the condition of a fixed setting of manual control 19, an increase in wheel loading will result in a decrease in operating speed of motors 16 with an attendant increase in current to the motor. The additional current to the motors 16 is supplied by generator 13. Thus, an increase in wheel loading results in an increased output current from generator 13. If the control current supplied to generator 13 through conductor 28 remains unchanged, the output voltage from the generator will remain relatively constant. In order to produce more current from a generator such as generator 13 at a constant voltage, it is necessary to turn the generator armature with greater torque. The engine 11 cannot provide the increased torque required because of the fixed setting of manual control 19, therefore, the engine speed will decrease. Generator 13 voltage will then decrease as a result of the decrease in generator speed and reduce the torque required to turn the generator. This process will continue until the speed is reduced to where the torque required to turn the generator 13 is equal to the output torque of engine 11 at the new speed. At this reduced speed the engine is not capable of producing its full power—an undesirable condition. In the present invention the current in the control coil is varied (and thus the generator output voltage is varied) as the generator 13 output current is varied to maintain the generator armature torque requirements (engine load) constant for a given setting of manual control 19.

When the vehicle with which the electric drive system is associated is motoring at steady state operation, the position of manual control 19 will induce a setting through transducer 46, linkage 22 and control unit 23 which will produce an electrical signal which is compared with the electrical signal provided by the speed sensor 24 over conductor 27. The difference between these two signals is employed to provide a third signal (over conductor 28) which controls the amount of current drawn through the control field in generator 13 and thus the load on engine 11.

One of the outstanding features of the present invention is its ability to use the speed of the engine 11 as the signal which controls the engine-generator output power in place of a signal provided by some power sensing device. Since control systems of the kind described operate to control power output, those known in the art characteristically measure the power output from the engine-generator combination and employ this measurement as the control to determine whether or not the output power is in agreement with that called for by the setting of the manual control 19. The great drawback to power sensing is the inherent difficulty in measuring power. The ability of the present control system to employ a speed signal, as opposed to a power signal, resides in the fact that diesel engine output power can be controlled by controlling the engine speed for a given manual control (throttle) setting. The generator loading and hence engine speed for a given manual control setting can be controlled by varying the current in the control field of the generator (controlling generator excitation). It follows that with an engine speed sensor, the generator excitation can be varied to hold constant engine speed and hence power for a given manual control setting. Any engine power and speed relationship can be obtained from the engine horsepower characteristic curves. By eliminating the need to measure generator output power, the control system of the present invention eliminates many components.

Figure 4:
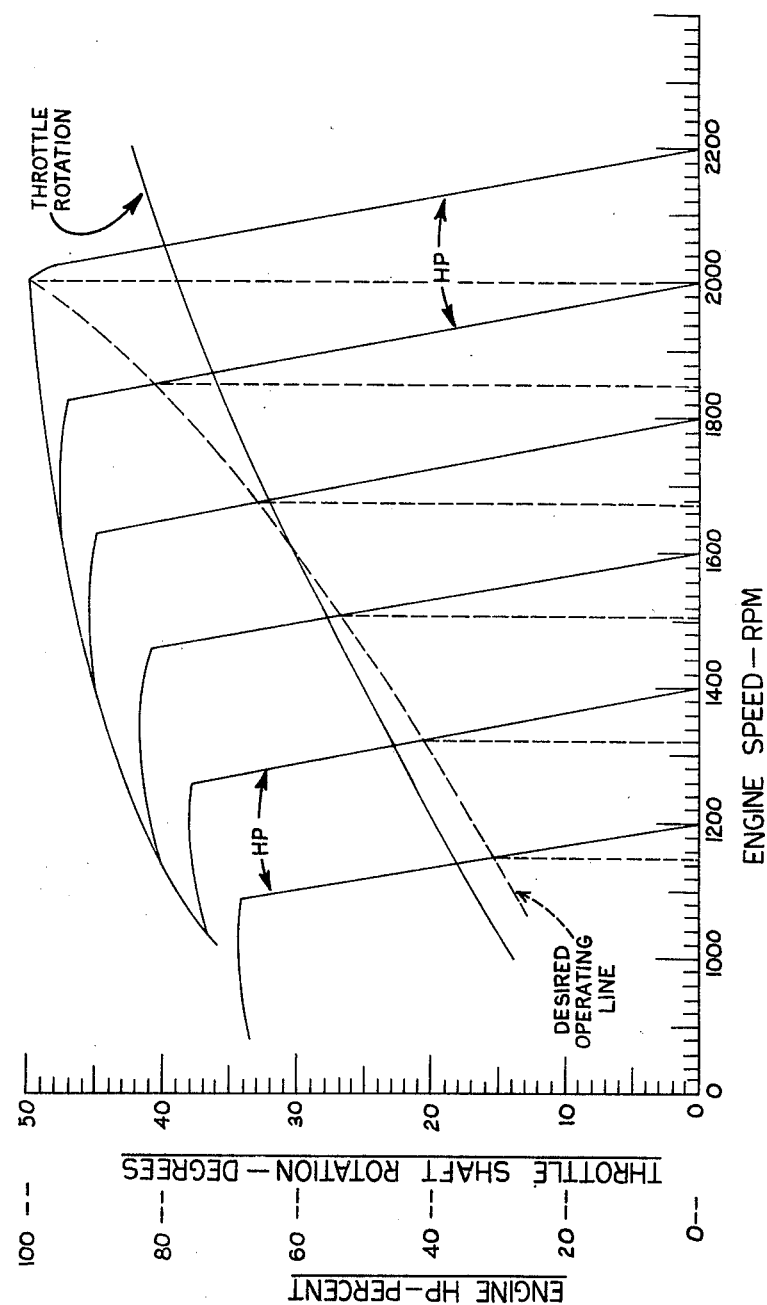
FIG. 4 is a graph of diesel engine characteristics determined by bench tests for a particular engine and governor and relating engine speed, engine output horsepower, and degree of throttle shaft rotation with a desired operating line superimposed thereupon.

It will be more quickly understood by reference to FIG. 4 of the drawings the manner in which it is possible for the control unit to respond to speed information only. By previously running bench tests on a particular diesel engine (including a governor), a correspondence can be obtained between engine output horsepower and engine speed. This correspondence for one particular engine is readily seen from examining the family of horsepower curves in FIG. 4. Bench tests are also previously run to determine the relationship between the degree of throttle shaft rotation, engine speed and values of throttle transducer voltage which corresponds thereto. Since there is a direct correspondence between the degree of throttle shaft rotation and the no-load engine speed in the governor, it is possible to determine beforehand, knowing the throttle shaft rotation, according to which one of the family of horsepower curves the engine will operate. Furthermore, knowing horsepower throttle shaft rotation parameters in terms of engine speed, and assuming, for example, that the control unit is required to cause the engine to work at the maximum output horsepower at any speed, a desired operating line, such as that shown in FIG. 4 may be constructed and may then be superimposed on these known curves. From this description of FIG. 4 it will be more readily ascertainable how the control system of the present invention is able to employ speed signals and not power signals to control the output power of a diesel engine. It will also become more apparent how the variable parameters of the control system may be set to accommodate any particular engine to any vehicle or how the same parameters may be set to accommodate a differently premised operating line.

When it is desired to provide more power to the wheels 17 the setting of manual control 19 is changed (the other condition calling for operation of control unit 23) to increase the speed of engine 11. In positioning control 19 to increase the speed of engine 11, linkage 21 causes the reference signal from transducer 46 via conductor 22 to control unit 23 to be changed with a resulting difference occurring between the reference signal in control unit 23 and the signal provided by speed sensor 24. When an increase in power is called for the resulting difference between the reference signal and the signal from speed sensor 24 causes the current in the control field of generator 13 to decrease and thereby reduce the load on engine 11. With a reduced load the engine 11 can quickly attain the speed of the new setting of control 19 and in so doing increase the signal which the speed sensor 24 delivers to unit 23. As the signal from speed sensor 24 increases it tends to become equal to the new setting of the reference signal in unit 23 and thereby re-establishes a steady state current in the control field of generator 13. When the control field is once again established the engine 11 is operating at a higher speed corresponding to the new setting of control 19 with a resultant increase in the output of the generator 13 and an accompanying increase in the power supplied to wheels 17. When it is desired to decrease the power to the wheels 17 the position of the manual control is altered to decrease the speed of engine 11 which once again results in a difference occurring between the reference signal in control unit 23 and the signal provided by speed sensor 24. The signal difference produced by a change in the position of manual control 19 to decrease the speed of engine 11 is such as to increase the current in the control coil of generator 13, which increases the load on the output of engine 11. The added load on the engine quickly reduces the engine speed which in turn reduces the signals from speed sensor 24 until it equals the reference signal in control unit 23 and the steady state control coil current is once again established. When the steady state current in the control coil is again established the engine 11 will be operating at a reduced speed corresponding to the new setting of control 19 with an attendant reduction in the output of generator 14 so as to decrease the power which the motors 16 supply to the wheels 17, as desired.

It is seen from the foregoing description of the operation of the control system in response to a change in the position of control 19 that the generator 13 is employed to load or unload the engine as the case may be to enable the desired speed of the engine to be quickly attained.

For a more detailed description of the invention attention is drawn in FIG. 2 wherein a power supply 31 furnishes electrical energy to the primary 32 of a three phase transformer 33. The power supply 31 can be an auxiliary alternator, the vehicle charging alternator or the vehicle battery with a suitable inverter transformer unit to bring the voltage to the correct level for control field excitation. The secondary 34 of transformer 33 is connected to a bank of rectifiers 36 which transforms the alternating current from the secondary 34 into a direct current at conductor 37. Conductor 37 is connected to the emitter 38 of a transistor 39 the collector 41 of which is electrically connected to the control field coil 42 of generator 13. Thus, the power supply 31 provides a source of electrical current for the control field coil 42 while a transistor 39 is electrically disposed between the coil 42 and its source of current to regulate the amount of current which passes through the coil. The transistor-coil loop is completed by a conductor 43 which connects the other end of coil 42 with the positive side of the rectifier bank 36. A diode 44 is placed in parallel with coil 42 to preclude inductive kick from damaging the transistor 39.

The speed sensor 24 (such as an engine tachometer) and a manually positioned transducer 46 each provide a signal which is applied to a transistor 47. When the two signals applied to the transistor 47 are approximately equal, the base 48 of transistor 39 which is connected to the emitter 49 of transistor 47 will be so biased as to induce coil 42 to draw sufficient current to establish a generator field which will result in the desired load, referred to above, being applied to the engine 11. When there is a difference between the signals applied to the transistor 47 from speed sensor 24 and manual control transducer 46 then the base 48 of transistor 39 will be biased to increase or decrease the current through coil 42 depending upon the load condition giving rise to the difference between the two signals.

Speed sensor 24 generates an A.C. signal which is proportional to the speed of the engine 11 and which passes through a rectifier 51 to a potentiometer 52. Potentiometer 52 has a tap which is electrically connected to the base 53 of transistor 47. By adjustment of the tap of potentiometer 52 the voltage applied to the base of transistor 47 for a given engine speed can be accurately predetermined.

The manual control 19 is mechanically coupled to the rotor 54 of transducer 46 so as to set the position of the rotor for each setting of the manual control. The rotor 54 is energized through power supply 31 which is electrically associated with the winding of rotor 54 through a pair of Zener diodes 56 which insure a well regulated source of electrical energy. A change in the position of the rotor of transducer 46 results in the voltage across the secondary 57 changing in value. A change in secondary voltage causes a like change in the value of the voltage at the emitter 49 of transistor 47, emitter 49 being electrically connected to the secondary 57 through a rectifier 58. Since a change in the value of the voltage at emitter 49 relative to the base 53 results in the biasing on the base 48 of transistor 39 changing, the current in control coil 42 will increase or decrease whenever manual control 19 is placed in a new position. The amount of the voltage change at the emitter 49 for a given change in the position of manual control 19 is dependent upon the functional relationship between manual control 19 and transducer 46 as determined by the linkage therebetween.

Whenever a change does occur in the voltage at the emitter 49, it is necessary for the speed of the engine to increase or decrease in order to once again have the bias on base 48 at a steady state value. The amount of increase or decrease in engine speed necessary to re-establish the proper signal at the base 53 for steady state operation is dependent upon the setting of potentiometer 52, which determines the voltage change at base 53 per change in r.p.m. of the engine as measured by the speed sensor 24. By proper selection of the funtcional relationship which exists between the manual control 19 and the transducer 46, and the speed sensor 24 and potentiometer 52 the control system of the present invention can be employed in combination with engines and generators of varying characteristics and can further be employed to alter the power output characteristics of a given engine-generator combination to meet the needs of a particular vehicle designed to work under particular load conditions.

As mentioned above, during steady state operation the signal provided to the base 53 of transistor 47 will approximately equal the voltage at the emitter 49 of transistor 47 such that base 48 of transistor 39 will be biased to draw steady state current through coil 42. If the vehicle operator desires more power, manual control 19 is repositioned causing the engine governor (not shown) to supply more fuel to the engine and cause the rotor 54 of transducer 46 to change its position with a resultant increase in the voltage across the secondary 57. An increase in the voltage acrosss the secondary of transducer 46 results in the voltage at the emitter 49 increasing relative to the voltage at the base 53 of transistor 47, causing a decrease in the current flowing in coil 42. As the current in coil 42 decreases, the load which the generator 13 presents to the engine 11 is decreased enabling the speed of the engine to rise rapidly in response to the change in position of the manual control 19. As the speed of the engine 11 increases the voltage across resistor 52 increases causing the voltage at the base 53 of transistor 47 to also increase until it equals the voltage at the emitter 49. When the emitter 49 and base 53 voltages are approximately equal the current drawn through transistor 47 will increase with a like increase in the current drawn through coil 42. Thus, during the time which engine 11 is increasing its speed it is not required to work against the full load of generator 13 and can thereby attain its new speed at a much faster rate.

If the operator of the vehicle wishes to decrease the power to the wheels or track, control 19 is positioned to cause the engine governor to decrease the fuel supply and to position the rotor 54 of transducer 46 to induce a decrease in the voltage across secondary 57 with a like decrease occurring at the emitter 49 of transistor 47. A decrease of the voltage at emitter 49 relative to base 53 results in biasing which gives rise to greater current being drawn through transistor 47 with an attendant increase in the current drawn through coil 42.

An increase in current through coil 42 results in an increased load being applied to the engine 11 by the generator 13, which assists the engine in reducing its operating speed. When the desired operating speed, as selected by the position of manual control 19, is attained by the engine, the voltages at base 53 and emitter 49 will be approximately equal and the current through coil 42 will be at a steady state operating level.

While the feature of the control system of the present invention which unloads the engine in response to a call for more power is highly desirable, in that it provides a fast responding system, complete unloading is not always desirable. During engine acceleration the amount of engine unloading can be controlled by a series combination of capacitor 61 and resistor 63 disposed between conductor 37 and conductor 64, the latter of which connects with the negative terminal of rectifier 58. The capacitor 61 and resistor 63 control the current from base 48 to emitter 38 of transistor 39 and thereby control the current in field 42 during the transient period after the transducer 46 setting has been changed to increase its output. The time constant of capacitor 61 and resistor 63 determines the time that the engine is loaded during acceleration. The magnitude of resistor 63 determines how much the engine is loaded during acceleration. The capacitor resistor circuit further provides for initial high loading of generator 13 (the initial charging current through capacitor 61 being relatively high) and corresponding vehicle acceleration as desired for fast response.

Referring now to both FIGS. 1 and 2 a speed sensor 66 (e.g. a tachometer) is mechanically associated with at least one of wheels 17 through a connection indicated at 67. The sensor 66 operates to produce a voltage across potentiometer 68 after being rectified by rectifier 69, the value of the voltage produced across potentiometer 68 being proportional to the speed of the wheel to which the sensor is connected. The tap 71 of potentiometr 68 is electrically connected through a Zener diode 72 and a diode 73 with a conductor 74 which connects emitter 49 with rectifier 58. By proper selection of a position for the wiper arm 71 the speed at which sufficient voltage will be established across the potentiometer to back bias Zener diode 72 to a point of causing breakdown can be accurately predetermined. This speed can be set, for instance, at the maximum speed to be obtained at the extreme setting of manual control 19 or at any other desired speed. When the speed exceeding the predetermined speed is reached and the Zener diode 72 breaks down a voltage will be established on the emitter 49 of transistor 47 with the same results as occur when the voltage at the emitter 49 is increased by virtue of a change in the setting of manual control 19. More particularly the increase in voltage at emitter 49 will decrease the current through coil 42 thereby reducing the voltage output of the generator with an attendant decrease in the power supplied by the D.C. motors 16 to the wheels 17. Thus, the speed sensor 66 is incorporated into the control system 23 to automatically decrease the power to the wheels when a predetermined maximum wheel speed has been exceeded.

Figure 3:
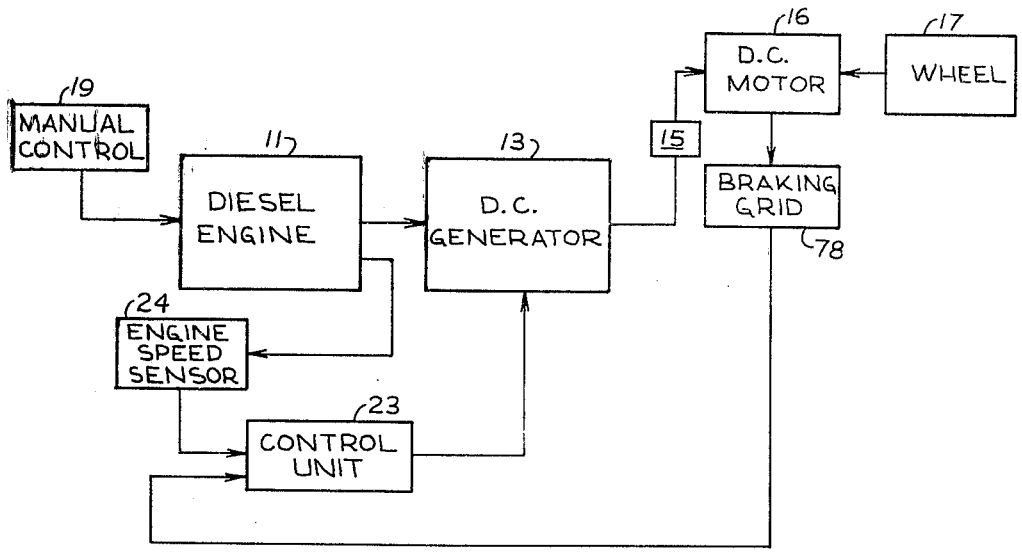
FIG. 3 is a block diagram similar to FIG. 1 showing the active system components during dynamic braking.

Referring now to FIG. 3 it is seen that the control system of the present invention differs for dynamic braking purposes from that for motoring purposes in that the control unit 23 does not receive a reference signal from manual control 19 but rather receives a signal from a braking grid 78 which is associated with a D.C. motor 16 (only one of which is shown in this figure). A further change in the system for dynamic braking results as a consequence of the operator of the vehicle positioning a switch 15 from the "motoring" position to the "braking" position with the results that the generator 13 now supplies current to the field coils of the motor 16 to induce the motors to operate as generators. Thus, the motors 16 generate electrical energy from the wheels 17 turning the motors in the field provided by the generator 13. Current is passed through the braking grid 78 which in turn supplies a signal to control unit 23; the signal being proportional to the amount of electrical energy which the grid receives from the motor 16. As seen in FIG. 2 braking grid 78 includes a resistor 79 having a tap 80 which is electrically connected to a resistor 81 which connects to the emitter 49 of transistor 47 through a switch 76. Switch 76 is positioned to connect resistor 81 to emitter 49 and break the connection between the emitter 49 and secondary 57 of transducer 46, when dynamic braking is desired. A capacitor 77 is placed across a portion of resistor 79 to minimize voltage overshoot across the resistor 79 during the dynamic braking operation. It is to be noted that the delay circuit of capacitor 61 and resistor 63 is removed from the control unit by switch 76' during dynamic braking operation.

The amount of braking which the motors 16 provide is dependent upon the magnitude of the current supplied to the motor fields by generator 13, and wheel speed. As engine speed is increased so also is the voltage at base 53 of transistor 47 thus requiring greater amounts of voltage at emitter 49 to cause a balanced situation in which the coil 42 draws steady state current. Since increases in voltage at emitter 49 only occur when greater amounts of voltage are established across the braking grid 78 it can be readily seen that to increase the dynamic braking the operator of the vehicle must increase the engine speed.

While the wheel overspeed portion of the control system of the present invention has been described separately from the dynamic braking portion of the system, it will be obvious to those skilled in the art that the wheel speed sensor could be associated with a relay solenoid which would not only decrease the power to the wheels when a preset speed is exceeded, but could also cause the system to switch from a motoring condition to a dynamic braking condition to more quickly reduce the speed of the wheels and traction motors to be within the desired maximum limit. It will also be apparent to those skilled in the art that the speed sensors 24 and 66 could be replaced by sensors having direct current outputs and thus not requiring rectifier units associated therewith. It will further be recognized that the closed loop control system could be used in conjunction with D.C. electric drive systems of various horsepower ratings. The only change required to adapt the subject control to a system of different capacity would be in the control field circuit (transistor 39, rectifier unit 36, and associated wiring). Other changes which are well within the scope of the teaching of the present invention include the use of a source 31 which is not provided exclusively for the purpose of providing current to coil 42 but also serves to operate other electrically driven apparatus such as blowers, winches, etc. It would also follow to those skilled in the art, that substitutions of A.C. machines for D.C. machines described herein would produce certain advantages. It will also be recognized by those skilled in the art, that maximum generator voltage and current limits can be incorporated into the control system in a manner to override transistor 47 or 39 biasing.

As set out above, one of the outstanding features of the control system of the present invention is its ability to accurately control the operation of the engine-generator combination without requiring a power measurement to be made and thereby reducing the number and size of components required. There is, however, a further advantage in sensing speed rather than power. Once the control adjusts for a particular diesel-electric combination, engine wear with resultant change in engine horsepower curves does not materially affect vehicle operation since operation will remain in the same speed ranges with the available power at each range being slightly reduced. Conversely, a power sensing control would cause operation to occur in the lug portion of the horsepower curve of the engine if no adjustments were made, thereby greatly decreasing the efficiency at which the vehicle operates.

Another important feature of the present invention is the fact that vehicle operation does not cease altogether upon failure of the control system. While the shunt field coils do not provide sufficient field strength to operate the vehicle under load conditions, they can at full engine speed, provide enough of a field to enable the vehicle to be driven to a repair station or the like.

What is claimed is:

1. A control system for earthmoving vehicles propelled by ground-engaging means driven by at least one electric motor which is fed from a generator driven by an engine, the control system comprising in combination:
   a manually adjustable throttle associated with the engine and operative to effect a desired engine speed corresponding to a predetermined throttle setting;
   a transducer associated with said throttle and operative to produce a desired electrical engine speed reference signal corresponding to the setting of the throttle;
   engine speed sensor means driven by said engine and operative to provide an electrical engine speed feedback signal corresponding to actual engine speed;
   a generator field control coil and circuit therefor;
   a source of electrical power for said coil;
   a control unit disposed during vehicle motoring condition to receive only said reference and said feedback signals and comprising biasing means and field coil power gating means, the biasing means being disposed to receive the feedback signal and said reference signal and responsive to produce a control signal which is proportional to the difference therebetween the field coil power gating means being disposed in the coil circuit and responsive directly to said reference signal to vary the magnitude of the current in said coil, in a first direction inversely proportional to a change in said throttle setting, and responsive to said control signal to vary said coil current magnitude in a second direction in proportion to engine speed changes reflecting said changed throttle setting.

2. The control system of claim 1 wherein said biasing means consists of a control transistor having a base, collector and emitter and wherein said field coil power gating means consist of a power transistor having a base, collector, and emitter;
   and wherein the power emitter and collector is disposed in said field coil circuit;
   and wherein the control base is disposed to receive said feedback signal, the control emitter being connected to the power base and the control collector being connected to the power collector through said field coil.

3. The control system of claim 2 wherein said control unit further comprises a potentiometer electrically associated with said engine speed sensor means and said biasing means and operable to vary a unit voltage change in said feedback signal fed to the control base per unit change in speed of the engine.

4. The control system of claim 1 further comprising:
   vehicle speed sensing means driven by one of the ground engaging means, electrically associated with said transducer and operative to produce an overspeed electrical signal proportional to the operating speed of the ground engaging means;
   overspeed signal blocking means electrically associated with said vehicle speed sensing means and responsive to a value of overspeed signal corresponding to a predetermined excess value of vehicle speed to modify said reference signal.

5. The control system of claim 1 further comprising:
   a braking grid electrically associated with at least one electric motor and operative to provide a braking signal proportional to the electrical energy generated by said motor;
   switching means having a motoring position and a braking position and being electrically connected to said throttle, said control unit and said braking grid wherein manipulation of the switching means from the motoring position indicative of vehicle motoring condition to the braking position isolates the reference signal from said control unit and feeds the braking signal in lieu of the reference signal to the biasing means.

References Cited

UNITED STATES PATENTS 1,960,086  5/1934  Godsey ---------- 322—15 X
2,454,778  11/1948  Curry ------------ 318—147

FOREIGN PATENTS 128,107  6/1948  Australia.

ORIS L. RADER, Primary Examiner

W. E. DUNCANSON, Jr., Assistant Examiner

U.S. Cl. X.R.

290—45